July 24, 1956
G. H. MULLER
2,755,876
POWER STEERING BOOSTER OF THE HYDRAULIC TYPE
Filed Oct. 17, 1952
2 Sheets-Sheet 1
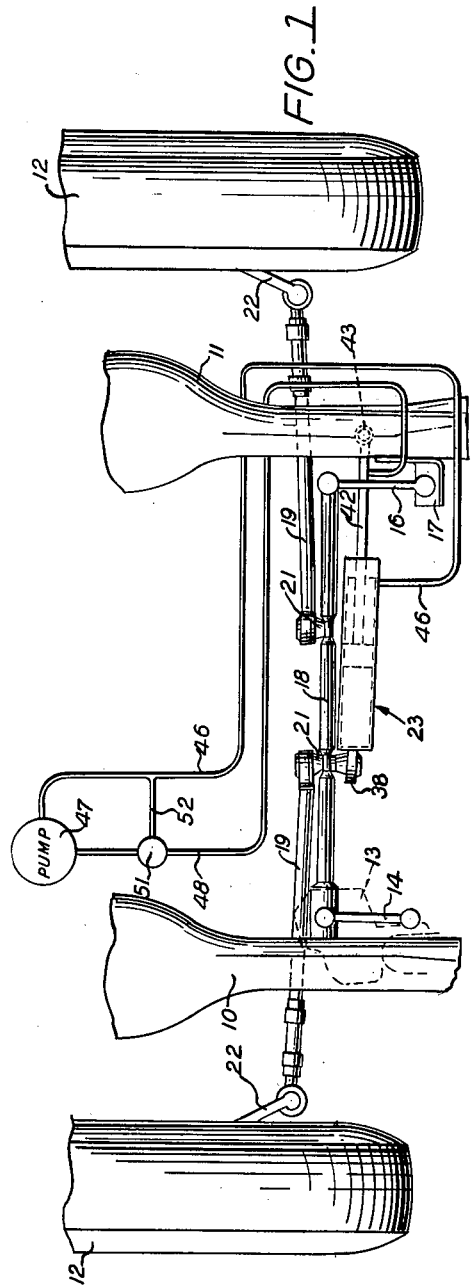
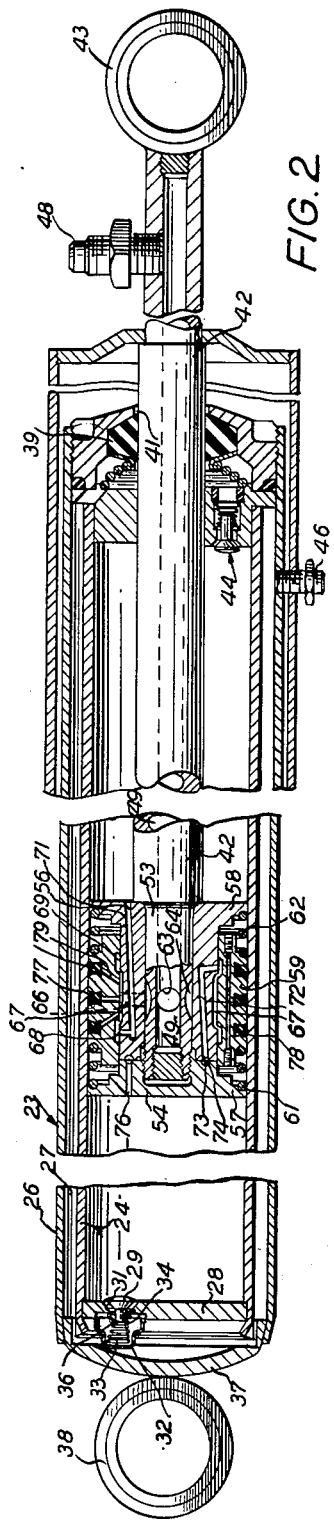
G. H. MULLER
INVENTOR.
BY E. C. McRae
J. R. Faulkner
D. H. Oster
ATTORNEYS July 24, 1956 G. H. MULLER 2,755,876
POWER STEERING BOOSTER OF THE HYDRAULIC TYPE
Filed Oct. 17, 1952 2 Sheets-Sheet 2

G. H. MULLER
INVENTOR.

BY

ATTORNEYS

United States Patent Office 2,755,876
Patented July 24, 1956

2,755,876

POWER STEERING BOOSTER OF THE HYDRAULIC TYPE

George H. Muller, Northville, Mich., assignor to Ford Motor Company, Dearborn, Mich., a corporation of Delaware Application October 17, 1952, Serial No. 315,352

7 Claims. (Cl. 180—79.2)

This invention relates generally to power steering devices and has particular reference to a motor vehicle steering mechanism in which the manual steering effort is reduced by the assistance of a hydraulic power device whenever the rim pull on the steering wheel reaches a given amount.

Another object of the present invention is to provide a combined piston and distributor unit for a power steering device of the booster type in which the piston is slidably mounted on the piston rod and is provided with means frictionally engaging the inner wall of the cylinder to initially cause the piston to move with the cylinder during the steering operation and to shift the piston relative to the piston rod, this relative movement between the piston and piston rod directing fluid under pressure to the appropriate end of the cylinder to provide power steering assistance. The invention also contemplates the use of a double cylinder with the annular chamber between the cylinders being used as an exhaust conduit for both ends of the cylinder, and with the piston rod being provided with an axial passageway therethrough serving as the pressure passageway delivering fluid under pressure from the fluid source to the combined piston and valve assembly.

Other objects and advantages of this invention will be made apparent as this description proceeds, particularly when considered in connection with the accompanying drawings, in which:

Figure 1 is a semidiagrammatic plan view of the forward portion of a motor vehicle chassis incorporating the power steering booster of the present invention.

Figure 2 is an enlarged transverse cross sectional view through the cylinder, piston and distributor assembly shown in Figure 1, with the parts thereof shown in neutral position.

Figures 3, 4:
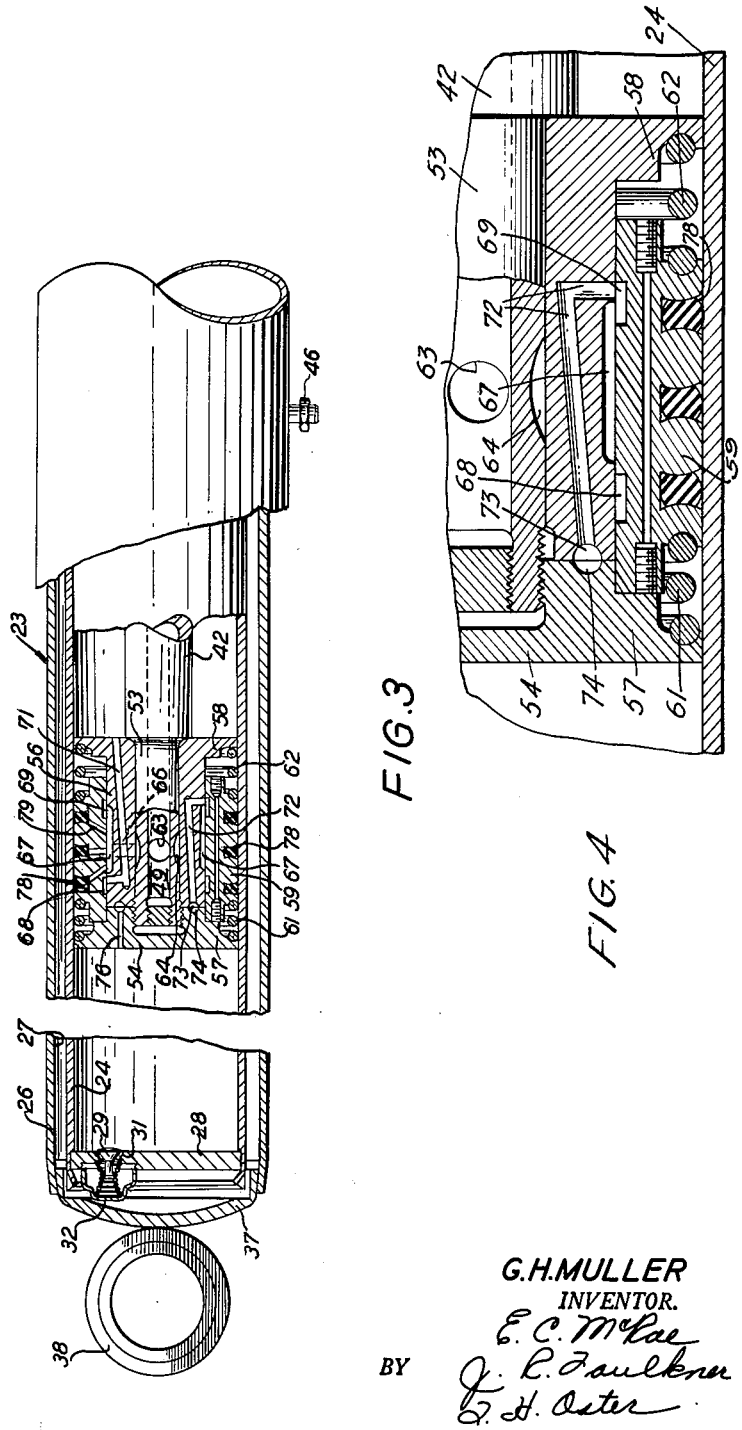
Figure 3 is a cross sectional view similar to Figure 2 but showing the parts in their relative positions during a right turn.
Figure 4 is an enlarged cross sectional view of the lower portion of the piston in the position shown in Figure 3.

Referring now to the drawings, and particularly to Figure 1, the reference characters 10 and 11 indicate the side frame members of a motor vehicle. Front road wheels 12 are mounted upon the chassis for turning movement about conventional king pins (not shown) and are controlled by conventional steering linkage and a manually operable steering gear. The steering gear assembly 13 is mounted upon the left side frame member 10 and actuates a pitman arm 14. Located symmetrically opposite the pitman arm 14 is an idler arm 16 pivotally connected at its rearward end to a bracket 17 carried by the right side frame member 11. A drag link 18 extends between the forward ends of the pitman arm 14 and the idler arm 17, being pivotally connected thereto. The inner ends of a pair of tie rods 19 are connected by means of ball joints 21 to laterally spaced intermediate points on the drag link 18. The outer ends of the tie rods 19 are pivotally connected to the rearward ends of the spindle arms 22 of the front road wheels 12.

The construction thus far described is conventional and is utilized, with some variations in the linkage, in the majority of passenger cars produced today. To provide power assistance to the manual steering mechanism described above, there is provided a power steering booster unit incorporating a cylinder assembly 23 having coaxial inner and outer cylinders 24 and 26 respectively, forming therebetween an annular chamber 27, functioning, as will be described more in detail later, as an exhaust passage. An end plate 28 is secured to the left hand end of the inner cylinder 24 and carries a valve 29 arranged to cooperate with a valve seat 31 provided in the end plate. A cap 32 is mounted upon the end plate and houses a pair of springs 33 and 34 engageable with opposite sides of a flange 36 carried at the end of the valve 29 and functioning to normally maintain the valve 29 spaced from the valve seat 31 as shown in Figure 2.

An end cap 37 closes the left hand end of the outer cylinder 26 and has welded thereto a ring 38 which in turn is pivotally connected to the rearward end of the ball joint 21 between the drag link 18 and the left hand tie rod 19, as best seen in Figure 1.

The right hand ends of the inner and outer cylinders 24 and 26 are closed by an end cap 39 having a central bore 41 through which the piston rod 42 extends. The outer end of the piston rod 42 is welded to a ring 43 which in turn is pivotally connected to the right side frame member 11. The end plate closing the right hand end of the inner cylinder 24 is provided with a valve assembly 44 identical in construction to the valve assembly provided in the left hand end plate 28, and normally held in open position by a pair of oppositely acting springs.

It will be seen that the valves in the opposite ends of the inner cylinder 24 provide communication between the inner cylinder and the annular chamber 27 between the two cylinders. An exhaust conduit 46 extends from the annular exhaust chamber 27 to the pump 47, which is shown diagrammatically in Figure 1 and may be of any conventional type, including an integral relief valve (not shown).

The reference character 48 indicates a pressure conduit leading from the pump 47 to the piston rod 42 and communicating with an axial pressure passage 49 formed in the piston rod. A single actuating valve 51 is provided in the pressure conduit 48 and is arranged to bypass fluid through the conduit 52 to the return line 46 whenever the steering wheel rim pull is below a certain value under which no assistance from the booster is required. The actuating valve 51 is designed in such a manner as to close the bypass line 52 whenever the rim pull of the steering wheel for a left or a right turn is above the predetermined value where assistance is required. The actuating valve 51 is preferably located between the steering wheel and the steering gear unit 13.

With reference now to Figure 2, it will be noted that the piston rod 42 has a reduced end portion 53 supporting a sleeve formed of two sections 54 and 56 for ease of manufacture and assembly. The sleeve section 54 is threaded on the end of the piston rod and clamps the sleeve section 56 against the shoulder formed by the reduced end portion 53 of the piston rod. End flanges 57 and 58 are formed on the sleeve sections 54 and 56 respectively and form stops limiting the travel of a hollow piston 59 mounted for axial sliding movement upon the sleeve sections 54 and 56. A pair of springs 61 and 62 are located between the opposite ends of the piston 59 and the end flanges 57 and 58 to normally center the piston between the end flanges.

The axial pressure passageway 49 formed in the piston rod 42 communicates through a port 63 with an annular groove 64 formed on the periphery of the reduced portion 53 of the piston rod. The annular groove 64 of the piston rod in turn communicates through a radial passageway 66 to an annular groove 67 formed on the outer periphery of the sleeve section 56. The piston 59 is formed on its inner periphery with a pair of axially spaced annular grooves 68 and 69 each communicating, in the neutral position of the piston as shown in Figure 2, with the elongated annular groove 67 on the sleeve.

Piston groove 68 is aligned with a passageway 71 in the sleeve section 56, with the opposite end of the passageway 71 extending generally axially through the sleeve and opening into the cylinder at the right hand end of the sleeve. Piston groove 69 is aligned with a passageway 72 extending generally axially through the sleeve section 56 and communicating with an annular groove 73 formed at the left hand end of sleeve section 56. Sleeve section 54 is provided with an annular groove 74 on its face aligned with groove 73 and also with a passageway 76 communicating with the cylinder at the left hand end of the sleeve. It will therefore be seen that the piston grooves 68 and 69 are adapted to communicate respectively with the inner cylinder 24 at the opposite ends of the piston assembly.

The outer periphery of piston 59 is formed with a series of three axially spaced annular grooves 77 within which are seated resilient rubber sealing rings 78. Each of the grooves 77 is arranged to communicate with the bore of the piston adjacent the elongated annular groove 67 formed in the sleeve by means of a generally radially extending passageway 79. As a result, pressure is supplied to the grooves 77 in the piston at the radially inner sides of the resilient sealing ring 78 to expand the latter outwardly into frictional engagement with the inner wall of the inner cylinder 24. This not only provides an efficient seal but also provides frictional resistance to sliding movement of the piston within the cylinder.

In the neutral position of the mechanism as shown in Figure 2, the elongated annular groove 67 on the periphery of the sleeve communicates with both of the piston grooves 68 and 69. When the steering wheel is turned manually to steer the vehicle either to the right or left, the steering gear mechanism 13 operates the pitman arm 14 and the drag link 18 is moved laterally. The cylinder assembly 23, being connected to the drag link by means of the eye 38 and ball joint connection 21, moves laterally with the drag link as a unit. As long as the valve 51 remains open, no pressure develops in the pressure line 48, and the power steering mechanism is inoperative, the vehicle being steered manually. As soon, however, as the steering wheel rim pull exceeds the predetermined amount necessary to close the valve 51, pressure develops in the line 48 and is transmitted through the passageway 49 in the piston rod 42, port 63, groove 64, passageway 66, groove 67, and passageways 69 to the rubber sealing rings 78. The fluid pressure on the sealing rings forces the latter radially outwardly into frictional engagement with the inner wall of the inner cylinder 24, causing the piston 59 to tend to move axially with the cylinder assembly. Inasmuch as the piston rod 42 and the sleeve 54—56 carried thereby are fixed relative to the frame, this results in axial movement of the piston relative to the sleeve.

During a right turn, the drag link 18 and cylinder assembly 23 are shifted to the left, and the corresponding movement of the piston 59 moves the piston groove 68 out of alignment with the elongated annular depression 67 of the sleeve so as to block passageway 71 in the sleeve and to direct the fluid pressure through piston groove 69 and passageways 72, 73, 74 and 76 to the left hand end of the inner cylinder 24. The introduction of fluid pressure into the left hand end of the cylinder alone is effective to seat valve 29 against its valve seat 31 to close communication with the return chamber 27 between the two cylinders. Thereafter, the pressure builds up in the left hand end of the cylinder moving the cylinder assembly 23 and the drag link 18 connected thereto to the left as shown in Figure 1 to provide power assistance to the right turn. During this time, the valve unit at the right hand end of the inner cylinder 24 is open to permit the low pressure exhaust fluid to return from the right hand end of the cylinder to the pump through the annular chamber 27 between the cylinders and thence through the return conduit 46 to the pump.

Similarly, turning the steering wheel to the left results in moving the drag link and cylinder assembly to the right as shown in Figure 1, and inasmuch as the piston 59 is frictionally held against the inner cylinder 24 by means of the pressure backed sealing rings 78, the piston is shifted to the right relative to the sleeve at the inner end of the piston rod. This movement closes piston groove 69 and directs the fluid pressure through piston groove 68 and sleeve passageway 71 to the right hand end of the inner cylinder to provide power assistance to the turning movement. During this operation, the right hand valve 44 closes while the left hand valve 29 remains open to permit fluid in the left hand end of the cylinder to return through the annular chamber 27 and return line 46 to the pump.

It will thus be apparent that the unit is responsive to manual steering effort in either direction to actuate the distributor mechanism carried at the inner end the piston rod to supply power assistance to the turning operation.

It will be understood that the invention is not to be limited to the exact construction shown and described, but that various changes and modifications may be made without departing from the spirit and scope of the invention, as defined in the appended claims.

What is claimed is:

1. In a power steering device for a motor vehicle having a frame member, steerable road wheels and a manually operable steering gear mounted upon said frame member, and a movable steering linkage member between said steering gear and said road wheels to transmit manual steering effort to said road wheels, a cylinder connected to one of said members, a piston rod connected to the other of said members and having a portion thereof extending through said cylinder, a piston slidably mounted upon the inner end of said piston rod for axial movement with respect thereto throughout a predetermined range, spring means associated with said piston yieldably holding the latter at an intermediate position within its predetermined range of sliding movement relative to said piston rod, a resilient sealing member carried by said piston at the outer periphery thereof for engagement with said cylinder, a source of fluid pressure, a passageway in said piston rod communicating with said source of fluid pressure, means establishing communication between said passageway and said resilient sealing member to apply fluid pressure to the latter to urge said sealing member into frictional engagement with said cylinder and providing frictional resistance to sliding movement of said piston within said cylinder, said piston and piston rod having cooperating passageways providing communication between the pressure passage in said piston rod and one end of said cylinder when said piston has been moved a predetermined amount relative to said piston rod from said intermediate position in one direction and establishing communication between the pressure passage in said piston rod and the opposite end of said cylinder when said piston has been moved relative to said piston rod a predetermined amount in the opposite direction from its said intermediate position.

2. The structure defined by claim 1 which is further characterized in that said piston comprises a hollow sleeve having an annular groove formed in its outer periphery and receiving said resilient sealing member, said piston being provided with a passageway extending from said annular groove to the bore of said sleeve, and said piston rod having at its inner end a passageway extending from the pressure passage therein to the outer periphery thereof and registering with the passageway in said piston in the intermediate neutral position of the piston relative to the piston rod so as to provide fluid under pressure urging said sealing member into frictional engagement with said cylinder to shift said piston relative to said piston rod during the initial relative movement between said frame member and said steering linkage member to direct fluid under pressure from said source to one end of said cylinder to provide power assistance to the manual steering effort.

3. The structure defined by claim 1 which is further characterized in that a second cylinder is provided surrounding said first cylinder and forming therebetween an exhaust chamber, and normally open valves at the opposite ends of said cylinder providing communication between the ends of the cylinder and the exhaust chamber during a recovery stroke but automatically closing under the action of fluid pressure in the cylinder during a power stroke.

4. The structure defined by claim 1 which is further characterized in that said resilient sealing means comprises a plurality of sealing rings seated in axially spaced grooves on the periphery of said piston, said piston having passageways therethrough between said annular grooves and the bore of said piston, said piston rod having a passage therein extending from the pressure passage in said piston rod to the passageways in said piston leading to said annular grooves in the neutral intermediate position of the piston relative to the piston rod, the range of axial sliding movement of said piston on said piston rod being such that in one relative position of said piston and piston rod the passageway from one of said annular grooves on the periphery of the piston is moved out of registration with the passageway in the piston rod to eliminate the application of fluid pressure to the resilient sealing ring in said last mentioned angular groove in the piston.

5. In a power steering device for a motor vehicle having a frame member and a movable steering member, a cylinder connected to one of said members, a piston rod connected to the other of said members and extending into said cylinder for relative reciprocation therein, a source of fluid pressure, a pressure passage in said piston rod communicating with said source, a piston within said cylinder slidably mounted upon the inner end of said piston rod for relative axial movement with respect thereto between predetermined limits, a sealing member carried by said piston in frictional engagement with said cylinder, means subjecting said sealing member to fluid pressure from said source to impart a resistance to axial movement of said piston within said cylinder so that relative movement between said frame and steering members initially causes a relative movement between said piston and piston rod, said piston and piston rod having cooperating passageways therein arranged to provide communication between the pressure passage in said piston rod and one end of said cylinder upon a predetermined axial movement of said piston relative to said piston rod.

6. In a power steering device for a motor vehicle having a frame, steerable wheels connected to said frame, and steering linkage including a laterally movable drag link arranged to transmit steering effort to said road wheels, a laterally arranged cylinder connected to said drag link, a piston rod connected to said frame and extending into said cylinder, a source of fluid pressure, a passage in said piston rod communicating with said source, a sleeve surrounding the inner end of said piston rod and secured thereto and having a pressure passageway therein communicating with the pressure passage in said piston rod, said sleeve also having a pair of delivery passages therein communicating with opposite ends of said sleeve, a pair of axially spaced stops on said sleeve, a hollow piston slidably mounted upon said sleeve for relative axial movement with respect thereto between said stops, a pair of coil springs between stops and said piston to normally hold said piston at an intermediate position between said stops, a resilient sealing member carried by said piston and frictionally engaging said cylinder, means subjecting said sealing member to fluid pressure from said source of fluid pressure to provide frictional resistance to sliding movement of said piston in said cylinder upon movement of said drag link to move said cylinder relative to said piston rod so that said piston is initially moved with said cylinder and relative to said sleeve, and said piston having passage means therein establishing communication between the pressure passageway in said sleeve and one of the delivery passages therein upon a predetermined relative movement between said piston and sleeve to supply fluid under pressure to one end of said cylinder and to thereafter provide power assistance to the movement of said drag link.

7. In a power steering device for a motor vehicle having a frame, steerable wheels connected to said frame, and steering linkage including a laterally movable drag link arranged to transmit steering effort to said road wheels, a laterally arranged cylinder connected to said drag link, a piston rod connected to said frame and extending into said cylinder, a source of fluid pressure, a passage in said piston rod communicating with said source, a sleeve surrounding the inner end of said piston rod and secured thereto and having a pressure passageway therein communicating with the pressure passage in said piston rod, said sleeve also having a pair of delivery passages therein communicating with opposite ends of said sleeve, a pair of axially spaced stops on said sleeve, a hollow piston slidably mounted upon said sleeve for relative axial movement with respect thereto between said stops, a pair of coil springs between stops and said piston to normally hold said piston at an intermediate position between said stops, a resilient sealing member carried by said piston and frictionally engaging said cylinder to provide frictional resistance to sliding movement of said piston in said cylinder upon movement of said drag link to move said cylinder relative to said piston rod so that said piston is initially moved with said cylinder and relative to said sleeve, and said piston having passage means therein establishing communication between the pressure passageway in said sleeve and one of the delivery passages therein upon a predetermined relative movement between said piston and sleeve to supply fluid under pressure to one end of said cylinder and to thereafter provide power assistance to the movement of said drag link, said piston also provided with an annular groove receiving said resilient sealing member and with a passage therethrough establishing communication between said annular groove and the pressure passageway in said sleeve to apply pressure to said resilient sealing member to increase the frictional engagement of said sealing member with said cylinder.

References Cited in the file of this patent

UNITED STATES PATENTS 1,994,835     Sanford et al. _____ Mar. 19, 1935